United States Patent [19]

Engler

[11] 4,013,882
[45] Mar. 22, 1977

[54] THERMOMETER CARRYING CASE AND ILLUMINATING DEVICE

[76] Inventor: Elliott E. Engler, 5 Roosevelt Road, Westport, Conn. 06880

[22] Filed: Apr. 25, 1975

[21] Appl. No.: 571,590

[52] U.S. Cl. .............................. 240/6.46; 240/2 E; 240/10.68
[51] Int. Cl.² ........................................ F21V 33/00
[58] Field of Search ............ 240/6.4 R, 6.46, 10.68, 240/6.45 P, 6.45 R, 2 E, 2 AD

[56] References Cited
UNITED STATES PATENTS

| | | | |
|---|---|---|---|
| 2,554,854 | 5/1951 | Chomes | 240/6.46 X |
| 2,787,937 | 4/1957 | Prisament | 240/6.4 R X |
| 3,032,643 | 5/1962 | Parsons | 240/6.45 P |
| 3,268,716 | 8/1966 | Mack | 240/6.4 R |
| 3,370,161 | 2/1968 | Engler | 240/6.46 |

Primary Examiner—Edna M. O'Connor
Attorney, Agent, or Firm—Melvin I. Stoltz

[57] ABSTRACT

By providing a compact, easily held carrying case having an elongated recess in one surface thereof in which a thermometer is retainingly placed with said elongated recess incorporating a slotted aperture which is illuminated when desired for reading the thermometer, a unique thermometer carrying case and illuminating device therefore is achieved. Easy access to the electrical energy and the light source is provided by a removable surface on another surface of the carrying case. If desired, the portion of the carrying case juxtaposed above the thermometer may incorporate transparent magnifying material in order to assure easier reading of the thermometer. The illumination system can include reflectors for directing light through the slotted aperture. Also a removable holder for the light source and its source of electrical energy can be provided.

11 Claims, 10 Drawing Figures

THERMOMETER CARRYING CASE AND ILLUMINATING DEVICE

RELATED INVENTION

This invention is related to and is an improvement of my U.S. Pat. No. 3,370,161 issued Feb. 20, 1968.

BACKGROUND OF THE INVENTION

This invention relates to thermometer carrying cases and more particularly to illuminated thermometer carrying cases.

Thermometers used for taking temperatures of humans and warm blooded animals are relatively small and have calibrations which are positioned very close to one another, making it difficult to read the temperatures precisely except under excellent light conditions. Since a person's temperature is often taken at night or in a darkened room it cannot always be immediately read. Even in good light, it is often difficult to read thermometers accurately.

Therefore, it is a principal object of this invention to provide a compact, simply constructed device for providing illumination for reading a thermometer.

Another object of this invention is to provide a device for illuminating a thermometer as defined above which also acts as a carrying case for the thermometer.

Another object of this invention is to provide a thermometer case and illuminating device as defined above which securely retains the thermometer when placed therein simply and quickly without any difficult manual manipulations.

A further object of this invention is to provide a thermometer carrying case and illuminating device as defined above which magnifies the thermometer calibrations in order to aid the reading thereof.

Other more specific objects will in part be obvious and will in part appear hereinafter.

SUMMARY OF THE INVENTION

The novel thermometer illuminating device of the present invention comprises a housing or case having illuminating means and a readily accessible surface which incorporates an elongated recess adapted to accommodate a medical thermometer and securely retain the thermometer when inserted in the recess. This recess incorporates an elongated slot or aperture through which the illumination passes and which is in juxtaposed spaced relationship to the position of the thermometer's calibration. In this way, the illumination means when activated fully illuminates the thermometer for easy readability.

In one embodiment of the invention, a movable cover is hingedly attached to said body, closing over the surface incorporating the thermometer retaining recess. Preferably, this cover comprises transparent material in order to allow easy reading of the thermometer when the cover is closed. Therefore, added retention of the thermometer is provided while still allowing complete viewing of the calibrations on the thermometer. In this embodiment the illuminating means is preferably activated by pressing a button after closing the cover. In this way, secure retention and complete and readable illumination of the thermometer when placed in the carrying case is assured.

The illumination means which is housed in the carrying case comprises a light source, a source of electrical energy connected to the light source and switch means for providing electrical energy to the light source when desired.

The illuminating device of this invention has the advantage that it acts as a compact carrying case for the thermometer when not in use and provides a self-contained concentrated beam of light so the thermometer can be read at any time without disturbing the patient. After taking a person's temperature, the thermometer is placed in the recess in the case, the cover is closed, and the light is switched on. Sufficient light intensity is provided in order to assure complete readability of the entire thermometer over its calibrated length. If desired, magnifying means can be incorporated above the calibrated zone of the thermometer in order to further aid the readability of the thermometer.

The case above the illuminating device is preferably rectangular in order to make the device as compact as possible while still accommodating a medical thermometer which is long and slender. In the embodiment incorporating a movable cover, the cover is preferably hinged on the sides of the case and provided with a clasp or other locking means in order to keep the cover secure when the carrying case is being transported or provided with a lip portion overhanging the case to assure ease of movement of the cover.

The recess in the surface which is adapted to accommodate the thermometer preferably extends to the edge of that surface. In this way, the thermometer can be easily inserted into the recess and quickly and easily withdrawn when so desired. The bottom of the recess preferably incorporates the elongated slot or aperture which extends over at least that portion of the recess in which the calibrated portion of the thermometer will lie when properly positioned therein. In this way the entire calibrated portion of the thermometer will be illuminated for easy readability. The slotted portion of the recess may incorporate any suitable material such as glass or plastic, and if desired this material may be tinted, such as red or yellow, to avoid a harsh glare of light which might make reading of the thermometer difficult. If desired, the ends of the recess may be padded to prevent the thermometer from breaking when being inserted or removed from the recess or while being carried.

Spanning the width of the recess is a thermometer self-orienting retaining clip. This retaining clip is designed to pick up the contour of the usual thermometer construction which will ensure that the calibrated portion of the thermometer is positioned for readability. In this way, the clip not only provides a retaining function, assuring that the thermometer will not accidentally drop out of the recess, while also assuring that the thermometer is properly oriented for readability of the calibrated zone.

The source of electrical energy may be batteries of any desired size, but in the preferred embodiment, a single pen light battery is employed. The pen light battery is compact and provides sufficient energy to operate the light source. In the preferred embodiment, one surface of the carrying case is slidably removable in order to allow easy and ready access to the compartment housing the battery and the light source. In this way, replacement of either the battery or the light source can be rapidly and efficiently achieved.

The activating switch for completing the circuit and providing electrical energy to the illuminating means can be any suitable switch means. The particular position of the switch means depends upon the embodiment of this invention employed. One switch means which may be used is a push button switch which is activated manually. Preferably, the light source is activated when the thermometer is secured in its proper position with the cover closed in order to allow easy readability of the thermometer through the transparent cover. If desired, the switch means may be mounted on an external surface of the housing with the electrical circuit being completed when the switch is pressed manually. In this way, the embodiment of this invention which does not employ a movable cover would operate when the thermometer is located in place and the illuminating means is switched on when desired.

The invention accordingly comprises the features of construction, combinations of elements, and arrangement of parts which will be exemplified in the constructions hereinafter set forth, and the scope of the invention will be indicated in the claims.

THE DRAWINGS

For a fuller understanding of the nature and the object of the invention, reference should be had to the following detailed description taken in connection with the accompanying drawing, in which.

Throughout the several views of the drawings, the same reference numbers refer to the same elements.

DETAILED DESCRIPTION

Figure 1:
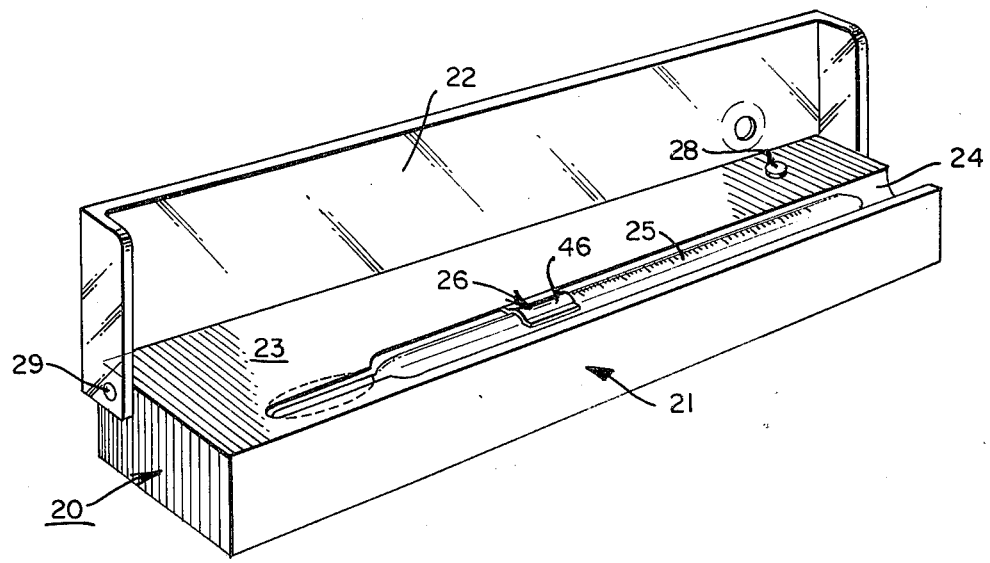
FIG. 1 is a perspective view of one embodiment of the thermometer carrying case and illuminating device of this invention, with a cover in the open position.

As shown in FIG. 1, one embodiment of the thermometer carrying case and illuminating device 20 of this invention is shown comprising a case 21 and a movable cover 22. Case 21 incorporates a top surface 23 with said top surface having therein a recess 24 adapted to accommodate a medical thermometer 25. As shown therein, recess 24 extends to the edge of case 21 in order to allow thermometer 25 to be easily inserted from the side into its retained position.

Figure 3:
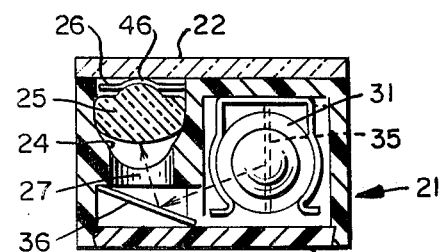
FIG. 3 is a cross sectional side elevation view of the thermometer carrying case and illuminating device of FIG. 2 taken along line 3—3 of FIG. 2.

Case 21 also incorporates a thermometer self-orienting retaining clasp 26. As shown in FIGS. 1 and 3, retaining clasp 26 is constructed to firmly and securely retain thermometer 25 in the desired orientation with the calibrations visible. This is achieved by constructing clasp 22 with a raised portion 46 which physically nests with the characteristic shape of typical thermometers. In this way, the proper orientation of the thermometer is assured with the calibrations being visible.

Case 21 also incorporates a circuit activating button 28 which, in this embodiment, is manually activated when pressed. Cover 22 is hingedly engaged with body 21 by pin means 29 in order to allow easy opening and closing of cover 22 over top surface 23.

As shown in FIG. 1, the bulb retaining portion of recess 24 can be shaped to accommodate either an oral or a rectal thermometer. The rectal shape for secure retention of a rectal thermometer is shown in phantom.

Figure 4:
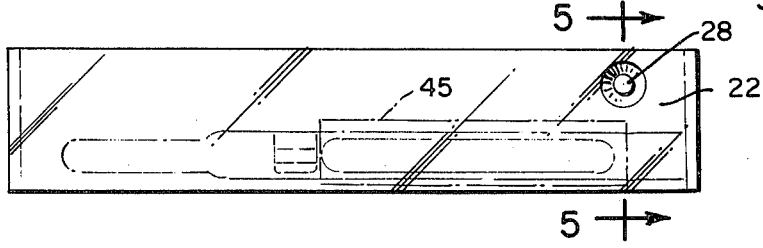
FIG. 4 is a top view of the thermometer carrying case and illuminating device of FIG. 1 with the cover closed.

In this embodiment, case 21 preferably incorporates a removable base 38, best seen in FIGS. 3 and 4. In this way, access to the illuminating circuit for repair or replacement can be easily achieved. In the embodiment shown, base 38 is slidably engaged with case 21 for easy removal. Of course, as would be obvious to one skilled in the art, base 38 could be hinged to case 21 for easy access to the illuminating circuit.

Figure 2:
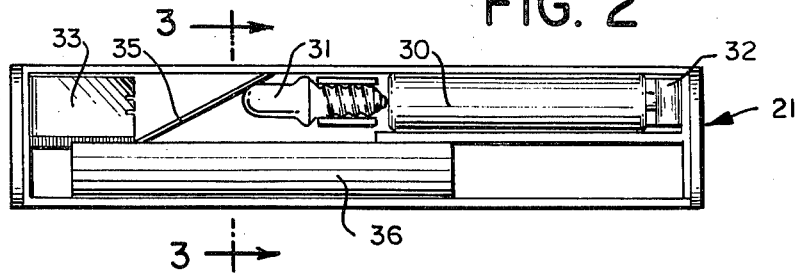
FIG. 2 is a bottom view of the thermometer carrying case and illuminating device of FIG. 1 with the bottom surface removed.

By referring to FIGS. 2 and 3, the construction and arrangement of the illuminating circuit and its operation can best be understood. The electrical energy is supplied by a battery 30 which, preferably, is a small pen light battery. One terminal of battery 30 is connected to light bulb 31 which provides all the illumination necessary to allow thermometer 23 to be readily readable. Light bulb 31 preferably comprises a common small electrical light bulb which is easily purchased. The other terminal of battery 30 is connected to contact plate 32 which in turn is connected by wires not shown to contact plate 33.

As will be more fully described below, the circuit is completed by activating push button 28. When the circuit is completed and light bulb 31 is fully illuminated, the light rays from light bulb 31 bounce off of a directing surface 35 which is pitched to direct substantially all of the incandescent light toward an elongated reflecting surface 36. Reflecting surface 36 is positioned to reflect all of the light striking this elongated surface upwardly through slot 27 of recess 24 onto thermometer 25 thereby illuminating it for easy readability.

Directing surface 35 and reflecting surface 36 comprises any suitable, highly polished, or highly reflective material. In this way, a relatively small incandescent light bulb, which is readily purchasable, can be employed for providing all of the light necessary to fully illuminate thermometer 25 making it readily and easily readable. In FIG. 3, directing surface 35 is shown in phantom in order to allow the relative position and arrangement of light bulb 31 to be seen. However, as clearly shown in FIG. 2, directing surface 35 is positioned forward of light bulb 31 substantially perpendicular to removable base 38 of case 21. Also, as shown in FIG. 3, reflecting surface 36 is positioned at an acute angle to base 38 beneath slot 27 in order to properly and completely reflect all of the light rays from directing surface 35 upwardly through slot 27 onto thermometer 25.

In the preferred embodiment, reflecting surface 36 incorporates an elongated sheet of material which spans the entire length of slot 27. Consequently, the entire calibrated area of thermometer 25 is completely illuminated for easy reading of all temperatures.

Figure 5:
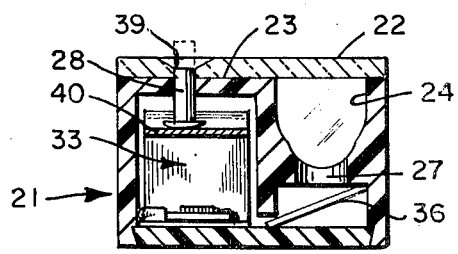
FIG. 5 is a side elevation view of the thermometer carrying case and illuminating device of FIG. 4 taken along line 5—5 of FIG. 4.

By referring to FIG. 5, one embodiment of the electrical energy activation construction can best be seen. In this embodiment, light bulb 31 is arranged to be manually turned on when push button 28 is pressed. Push button 28 is slidably engaged in hole 39 of case 21. The movement of push button 28 is controlled by spring biased arm 40 of contact 33. As shown in FIG. 1, spring biased arm 40 forces push button 28 upwardly thereby protruding above surface 23 of case 21. As shown in FIG. 5, when button 28 is moved downwardly arm 40 is forced downwardly into contact with arm 41 of contact 33. When contact is made between arms 40 and 41, the electrical circuit is completed and light bulb 31 is fully illuminated. In this embodiment, after the thermometer has been placed in recess 24 and button 28 has been pressed, the thermometer is illuminated and readily readable with cover 22 in either the open or closed position.

In FIG. 4 the thermometer carrying case and illuminating device of this invention is shown with cover 22 in the closed position with a thermometer readily visible through the transparent cover. In this embodiment, cover 22 incorporates a magnifying area 45 in juxtaposed spaced relationship to the calibrated area of thermometer 25. In this way, the readability of thermometer 25 is greatly enhanced by not only having the thermometer illuminated but also having the calibrations magnified for ease and convenience.

As will be obvious to one skilled in the art, the position of push button 28 can be changed by placing push button 28 on an exterior surface of case 21. By employing this manual push button construction, illumination is provided when necessary and the case can be used for carrying the thermometer without illumination thereof, thereby allowing transportation of the thermometer without using the battery.

Figure 6:
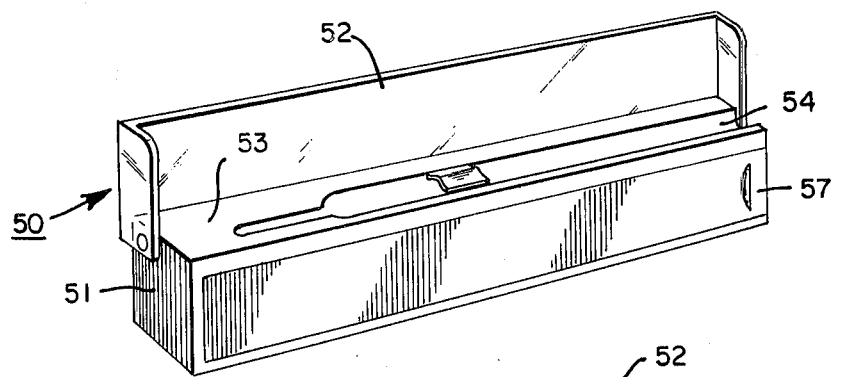
FIG. 6 is a top perspective view of another embodiment of the thermometer carrying case and illuminating device of this invention with a cover in the open position.
Figure 7:
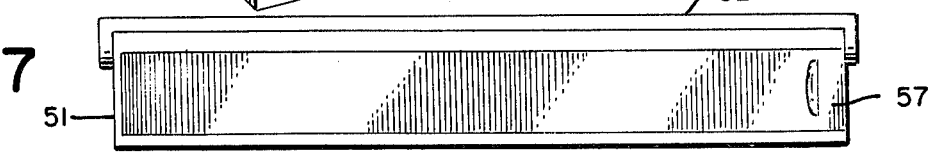
FIG. 7 is a rear elevation view of the thermometer carrying case and illuminating device of the invention taken along line 7—7 of FIG. 6.

By referring to FIG. 6—9, the construction and operation of another embodiment of the thermometer carrying case and illuminating device of this invention can best be understood. In this embodiment, the thermometer carrying case and illuminating device 50 comprises a case 51 and a transparent movable cover 52. Case 51 incorporates a top surface 53 with the top surface 53 incorporating a recess 54 adapted to accommodate a medical thermometer as described above. As shown in FIG. 6, recess 54 extends to the edge of case 51 in order to allow easy insertions of the thermometer within recess 54.

In this embodiment, case 50 comprises substantially the same dimensions as case 21 of FIG. 1, with surface 53, which incorporates recess 54, being substantially identical to one of the side surfaces of case 21. In this way, a slimmer, more easily handled unit is provided. Furthermore, as is described below, this change of orientation produces a cavity with a larger vertical dimension which accommodates a simplified illuminating system.

Case 51 also incorporates a removable rear side panel 57 which provides easy access to the interior of case 51 for repair or replacement of illuminating circuitry. Preferably, panel 57 is slidably engaged with case 51 in order to assure quick and easy access to the interior thereof.

By incorporating recess 54 in surface 53, rear side panel 57 and front surface 59 comprise a larger surface area than top surface 53. In this way, cavity 60 of case 51 comprises a larger vertical dimension than is provided with the embodiment shown in FIG. 1. As a result, it has been found that by employing the construction of case 51 in this manner, a sliding illuminating system can be employed which uses conventionally sized light bulbs and batteries.

Figure 8:
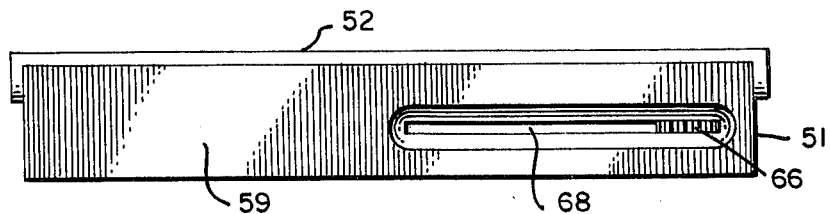
FIG. 8 is a front elevation view of the thermometer carrying case and illuminating device of this invention taken along line 8—8 of FIG. 6.
Figure 9:
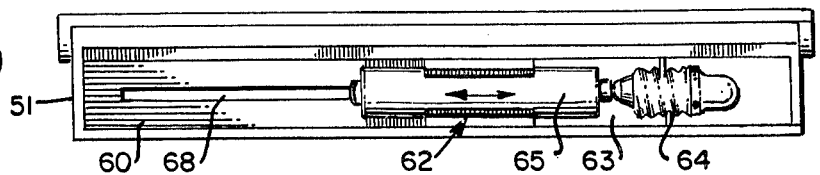
FIG. 9 is a rear elevation view of the thermometer carrying case and illuminating device of this invention similar to FIG. 7 with the sliding panel removed.

By referring to FIGS. 8 and 9, the construction and operation of the sliding illuminating system 62 can best be understood. Illuminating system 62 comprises a one-piece holding member 63 to which is mounted a conventionally sized light bulb 64 and a conventionally sized battery 65. Holding member 63 is slidably engaged within cavity 60 of case 51 and also incorporates an activating button 66 which protrudes through elongated slot 68 of front surface 69.

As will be more fully described below, the electronic circuit is activated by pressing button 66. Also, using button 66, the entire electronic system can be longitudinally moved within case 51 by controllably sliding button 66 along slot 68. In this way, light bulb 64 is illuminated and can be moved along the length of the thermometer placed within recess 54 in order to fully illuminate the thermometer for ease of readability.

In this embodiment, the elongated opening 55 in recess 54 is in juxtaposed relationship to light bulb 64. Consequently, when light bulb 64 is longitudinally moved within case 51, the light emitting therefrom will directly illuminate a thermometer house within recess 54. A similar direct illumination of a thermometer is disclosed and claimed in my U.S. Pat. No. 3,370,161. However, as disclosed therein, a smaller, non-conventionally sized light bulb is employed and a more complicated circuit is required.

Figure 10:
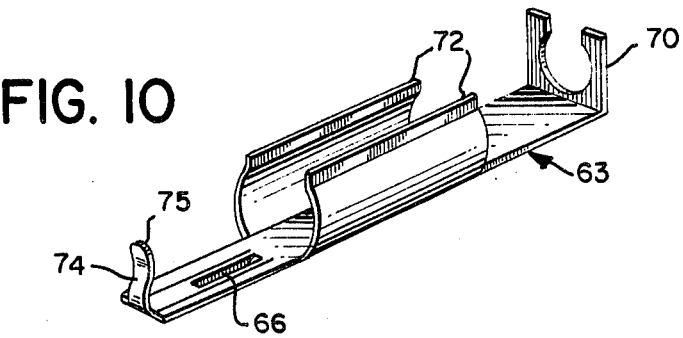
FIG. 10 is a perspective view of a one-piece light bulb and battery holder for use in the thermometer carrying case and illuminating device of this invention.

As shown in FIG. 10, the sliding member incorporated in the thermometer carrying case and illuminating device of this invention comprises an upstanding light bulb holding fin 70, two battery retaining clasps 72 and a movable button 66. Movable button 66 is formed within a flexible spring member 74 having a terminating contact end 75. When the light bulb 64 and battery 65 are mounted in position, as shown in FIG. 9, by pressing button 66, spring member 74 moves toward the battery contact causing contact end 75 to touch the battery. In this way electrical contact is made between the battery and the light bulb causing the light bulb to go on. As described above, while button 66 is pressed and the light bulb is ON, the entire holding member 63 can be easily slid into any position within cavity 60 of case 51 below elongated opening 55 in recess 54.

It will thus be seen that the objects set forth above, among those made apparent from the preceding description are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. An illuminating device for medical thermometers comprising a housing incorporating A. illuminating means contained within said housing;

B. access means formed in said housing for providing accessibility to said illuminating means;

C. switch means controllably connected to said illuminating means for activating and deactivating said illuminating means;

D. an elongated recess formed in a surface of said housing and extending to the edge of said surface, for securely holding and retaining the thermometer when not in use, said recess incorporating
  a. an elongated slot extending along a portion of said recess, and
  b. communicating with said illuminating means;

E. a cover
  a. mounted to said housing and overlying said elongated recess,
  b. at least a portion thereof being transparent, and
  c. incorporating thermometer securing means cooperating with the recess and moveably from a thermometer entry position to a thermometer holding position, assuring secure retention of a thermometer in the recess, and F. an elongated magnifier mounted to said cover in juxtaposed spaced relationship with said elongated recess extending at least the length of said elongated slot, and operably magnifying a thermometer's indicia whereby a medical thermometer securely positioned and retained within said recess is illuminated through said elongated slot and easily and accurately read through said transparent magnifier and cover portion.

2. Illuminating device defined in claim 1, wherein said illuminating means is further defined as comprising:
  a. a source of electrical energy,
  b. a light bulb conductively connected to said source of electrical energy, and
  c. a first reflecting surface in juxtaposed spaced relationship to said elongated slot for receiving and reflecting the light rays from said light bulb through said elongated slot.

3. The illuminating device defined in claim 2, wherein said illuminating means is further defined as comprising
  d. a second light ray reflecting surface in juxtaposed spaced relationship with said light bulb and extending transversely from side to side across said housing for receiving and reflecting said light rays toward said first reflecting surface.

4. The illuminating device defined in claim 1, further comprising
  F. a thermometer retaining clasp extending across the width of said recess and positioned to provide firm retention of a thermometer when inserted in said recess.

5. The illuminating device defined in claim 4, wherein said retaining clasp is further defined as comprising a thermometer self-orienting portion for nesting cooperation with the typical thermometer shape in order to assure proper positioning of the calibrated area of the thermometer.

6. An illuminating device for medical thermometers comprising a housing incorporating
A. an elongated recess formed in one surface of said housing and incorporating an elongated slot extending along a portion of said recess,
B. illuminating means contained within said housing and comprising
  a. a source of electrical energy,
  b. a light bulb conductively connected to said source of electrical energy, and
  c. a first reflecting surface in juxtaposed spaced relationship to said elongated slot for receiving and reflecting the light rays from said light bulb through said elongated slot;
C. access means formed in said housing for providing accessibility to said illuminating means; and
D. switch means controllably connected to said illuminating means for activating and deactivating said illuminating means;
whereby a medical thermometer placed within said recess is illuminated through said elongated slot in response to said controllable switch means.

7. Illuminating device defined in claim 6, wherein said illuminating means is further defined as comprising
  d. a second light reflecting surface in juxtaposed spaced relationship with said light bulb and extending transversely from side to side across said housing for receiving and reflecting said light rays toward said first reflecting surface.

8. An illuminating device for medical thermometers comprising
A. a housing;
B. an elongated recess formed in a surface of the housing for securely holding and storing the thermometer when not in use, said recess incorporating an elongated slot extending along a portion of said recess for communication with an illumination assembly;
C. a movable illumination assembly contained within said housing in juxtaposed spaced relationship to said elongated slot for controllable illumination of any portion thereof, and comprising
  a. a holding member slidably engaged within said housing;
  b. a source of electrical energy mounted within said holding member,
  c. a light bulb conductively connected to said source of electrical energy and mounted to said holding member, and
  d. switch means controllably connected to said source of electrical energy for activating and deactivating the energy source to said light bulb; and
D. access means formed in the housing for providing accessibility to said illuminating means, whereby a thermometer securely retained and stored in the recess is directly illuminated and easily read along any portion thereof.

9. An illuminating device defined in claim 8, further comprising
E. a thermometer retaining clasp extending across the width of said recess and positioned to provide firm retention of a thermometer when inserted in said recess.

10. An illuminating device defined in claim 9, wherein the holding member of said illuminating means comprises
  1. a base;
  2. an upstanding light bulb holding fin terminating at one end with said base and having a central aperture for screwable engagement of said light bulb;
  3. a pair of upstanding retaining clasps connected to said base for grippable engagement of said source of electrical energy; and
  4. said switch means of said holding member having a spring member connected to said base and having a first open position and a second closed position for controllably connecting said source of electrical energy to said light bulb, and a manually movable button connected to said spring member for moving said spring member between said first and second positions.

11. The illuminating device defined in claim 8, wherein said movable illumination assembly is further defined as being completely removable from the housing, thereby allowing complete sterilization of the housing.

* * * * *